US012513463B2

(12) United States Patent
Han

(10) Patent No.: US 12,513,463 B2
(45) Date of Patent: Dec. 30, 2025

(54) DISPLAY DEVICE AND OPERATING METHOD THEREOF FOR ADJUSTING AUDIO SETTINGS BASED ON EXTERNAL SPEAKER LOCATION

(71) Applicant: LG ELECTRONICS INC., Seoul (KR)

(72) Inventor: Dong Wan Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 100 days.

(21) Appl. No.: 18/420,316

(22) Filed: Jan. 23, 2024

(65) Prior Publication Data

US 2025/0175737 A1 May 29, 2025

(30) Foreign Application Priority Data

Nov. 23, 2023 (KR) ........................ 10-2023-0164156

(51) Int. Cl.
*H04R 3/12* (2006.01)

(52) U.S. Cl.
CPC ......... *H04R 3/12* (2013.01); *H04R 2205/024* (2013.01); *H04R 2420/07* (2013.01); *H04R 2499/15* (2013.01)

(58) Field of Classification Search
CPC ................ H04R 3/12; H04R 2205/024; H04R 2420/07; H04R 2799/15
See application file for complete search history.

(56) References Cited

U.S. PATENT DOCUMENTS

| | | | | |
|---|---|---|---|---|
| 9,749,575 | B1 | 8/2017 | Lee et al. | |
| 11,275,552 | B2 | 3/2022 | Kim et al. | |
| 12,143,682 | B2 | 11/2024 | Lee et al. | |
| 2003/0067535 | A1 | 4/2003 | Creed et al. | |
| 2013/0324031 | A1* | 12/2013 | Loureiro | H04S 7/301 455/3.06 |
| 2014/0185842 | A1 | 7/2014 | Kang et al. | |
| 2014/0328506 | A1* | 11/2014 | Banks | H04R 5/02 381/303 |
| 2016/0073197 | A1 | 3/2016 | Hammer et al. | |
| 2019/0356985 | A1* | 11/2019 | Milne | H04R 5/04 |
| 2022/0078553 | A1* | 3/2022 | Curtis | H04R 3/12 |
| 2022/0295206 | A1* | 9/2022 | Park | H04R 3/12 |

FOREIGN PATENT DOCUMENTS

| | | | |
|---|---|---|---|
| CN | 115866501 | A | 3/2023 |
| CN | 115884061 | A | 3/2023 |
| EP | 4 013 073 | A1 | 6/2022 |

(Continued)

*Primary Examiner* — James K Mooney
(74) *Attorney, Agent, or Firm* — Birch, Stewart, Kolasch & Birch, LLP

(57) ABSTRACT

A display device including a display configured to display image content; a wireless communication interface configured to wirelessly connect with a plurality of external speakers spaced a distance from the display; at least one positioning module configured to obtain position information of the plurality of external speakers identifying a spatial relationship between each external speaker and the display; and a controller configured to transmit an audio signal to be output by the external speakers, based on the obtained position information of the external speakers.

13 Claims, 15 Drawing Sheets

(56) References Cited

FOREIGN PATENT DOCUMENTS

| | | | |
|---|---|---|---|
| JP | 2007-60253 | A | 3/2007 |
| KR | 10-2017-0028625 | A | 3/2017 |
| KR | 10-2017-0095679 | A | 8/2017 |
| KR | 10-2021-0015540 | A | 2/2021 |
| KR | 10-2021-0030469 | A | 3/2021 |
| KR | 10-2423753 | B1 | 7/2022 |
| KR | 10-2023-0112272 | A | 7/2023 |
| WO | WO 2022/258990 | A1 | 12/2022 |

* cited by examiner

FIG. 9
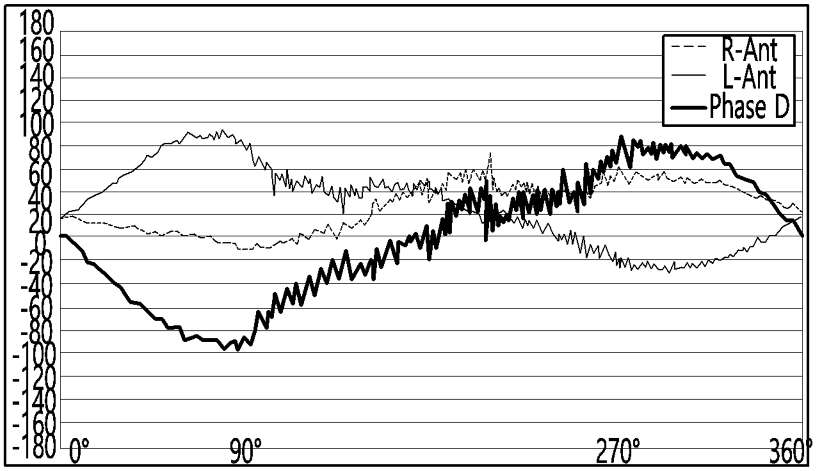
(a)
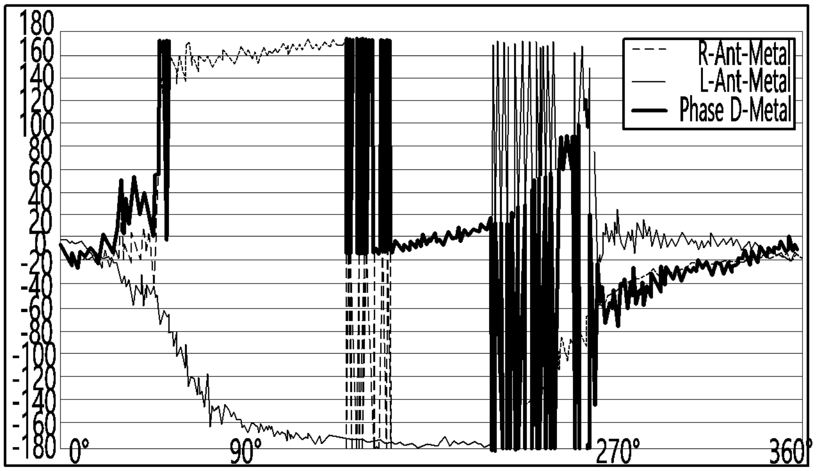
(b)

FIG. 13

| MEASURING CONDITION | 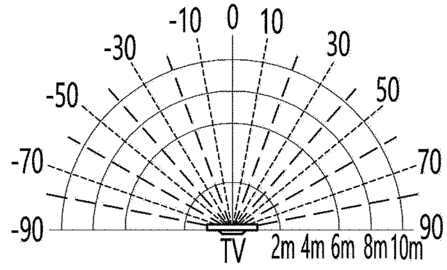  |
|---|---|

| | | | | | | |
|---|---|---|---|---|---|---|
| ANTENNA SHAPE | PCB ANTENNA APPLICATION 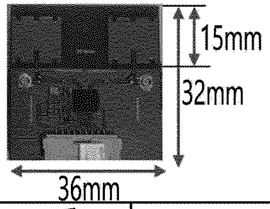  | | CHIP ANTENNA APPLICATION 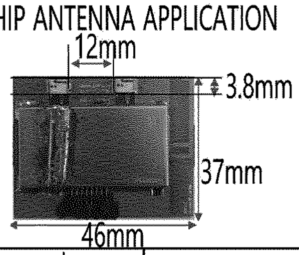  | | | |
| ANTENNA MOUNTING | 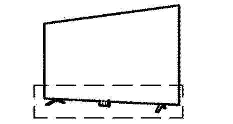 | 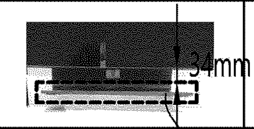  | | 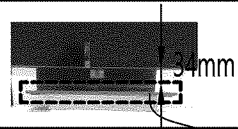  | | 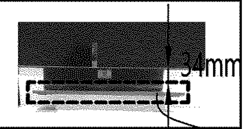  |
| | ① 2-POLE STAND | ② Z3 STAND | ③ 5.3mm_2-POLE STAND | ④ 5.3mm_Z3 STAND | ⑤ 6.5mm_2-POLE STAND | ⑥ 6.5mm_Z3 STAND |

s1 s1 s1 data 1 data 2

| ACTUAL ANGLE (LEFT, RIGHT) | ① PCB ANTENNA(5CH) | | ② PCB ANTENNA(5CH) | | ③ CHIP ANTENNA(9CH) | | ④ CHIP ANTENNA(9CH) | | ⑤ CHIP ANTENNA(9CH) | | ⑥ CHIP ANTENNA(9CH) | |
|---|---|---|---|---|---|---|---|---|---|---|---|---|
| | LEFT | RIGHT | LEFT | RIGHT | LEFT | RIGHT | LEFT | RIGHT | LEFT | RIGHT | LEFT | RIGHT |
| 0° | 2° | | 0° | | 2° | | 0° | | 3° | | 0° | |
| 10° | 10° | 15° | 10° | 5° | 10° | 15° | 10° | 20° | 5° | 15° | 20° | 20° |
| 20° | 15° | 20° | 20° | 15° | 20° | 25° | RIGHT **10°** | 20° | 10° | 25° | **5°** | 25° |
| 30° | 20° | 30° | 25° | 20° | 20° | 25° | **15°** | 25° | 20° | 35° | **15°** | 35° |
| 40° | 30° | 30° | 35° | 30° | **25°** | 35° | **20°** | 30° | **25°** | 40° | **20°** | **25°** |

data 3

| ACTUAL ANGLE (LEFT, RIGHT) | ① Metal ANTENNA(9CH) | | ② Metal ANTENNA(9CH) | | ③ Metal ANTENNA(9CH) | | ④ Metal ANTENNA(9CH) | |
|---|---|---|---|---|---|---|---|---|
| | LEFT | RIGHT | LEFT | RIGHT | LEFT | RIGHT | LEFT | RIGHT |
| 0° | | 5° | 0° | | | 5° | | 5° |
| 10° | 5° | 10° | 5° | NOT MEASURABLE | 5° | 10° | 0° | 15° |
| 20° | **0°** | 20° | 25° | 15° | **0°** | 15° | 15° | 10° |
| 30° | 25° | 35° | 20° | 20° | NOT MEASURABLE | 35° | 20° | 35° |
| 40° | **25°** | 45° | **25°** | 35° | **25°** | 40° | **25°** | 50° |

FIG. 15
| | ① UWB 2 ANTENNA, 1 BT (5CH, 9CH) | ② WJB 1 ANTENNA, 1 BT (5CH, 9CH) |
|---|---|---|
| ANTENNA SHAPE | 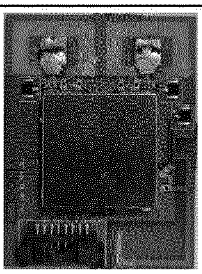 | 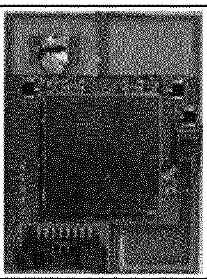 |
| ANTENNA MOUNTING | 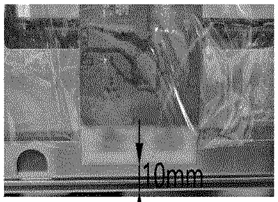  | 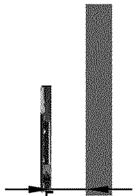  |
| | 10MM SPACED POSITION FROM LOWER END OF SET | 5MM SPACED POSITION FROM REAR SURFACE OF PANEL |
data 4 data 5
| ANGLE | ① Monopole 2 ANTENNA | | ② Monopole 1 ANTENNA | |
|---|---|---|---|---|
| | 9CH | 5CH | 9CH | 5CH |
| 0° | 12 | 18 | 11 | 18 |
| 45° | 14 | 18 | 15 | 18 |
| 90° | 15 | 18 | 15 | 18 |
| -45° | 11 | 12 | 10 | 12 |
| -90° | 15 | 18 | 15 | 18 |

DISPLAY DEVICE AND OPERATING METHOD THEREOF FOR ADJUSTING AUDIO SETTINGS BASED ON EXTERNAL SPEAKER LOCATION

CROSS-REFERENCES TO RELATED APPLICATIONS

This application claims priority to Korean Patent Application No. 10-2023-0164156, filed in the Republic of Korea on Nov. 23, 2023, the entire contents of which are hereby expressly incorporated by reference into the present application.

BACKGROUND OF THE INVENTION

Field of the Invention

The present disclosure relates to a display device, and more specifically, to a display device connected to a plurality of external speakers.

Description of the Related Art

Due to recent developments in not only video technology but also audio technology, the need for ordinary TV users to listen to audio with good sound is gradually increasing. Accordingly, the user can connect multiple speakers to the TV, and the TV can provide stereophonic sound to the user through the internal speaker and multiple speakers connected to the TV. In other words, the TV not only outputs sound through 1 channel, but also outputs different sounds using 2 or more channels, providing the user a sense of presence as if the user is actually there, and this effect can be referred to as a surround effect.

In order to provide stereophonic sound to the user, the display device can process audio signals based on the positions of each of several speakers. However, when the speaker moves and changes position and the display device processes the audio signal without reflecting the changed position, there is a problem in that stereophonic sound cannot be properly provided.

SUMMARY OF THE INVENTION

Technical Problem

Accordingly, an object of the present disclosure is to solve the problem that when the position of an external speaker changes, the changed position is not reflected in the process of providing stereoscopic sound.

Another object of the present disclosure is to minimize errors in the recognized positions of external speakers.

Still another object of the present disclosure is to minimize recognition errors caused by obstacles existing between a display device and an external speaker.

Yet another object of the present disclosure is to solve the problem that a module for recognizing the position of an external speaker has to be disposed to protrude outside the display device.

A display device according to an embodiment of the present disclosure includes a display configured to display images of content; a wireless communication interface configured to wirelessly connect with a plurality of external speakers; at least one positioning module configured to obtain position information of the plurality of external speakers (e.g., a physical spatial relationship of the external speakers to the display); and a controller configured to transmit an audio signal of the content to each of the plurality of external speakers, based on the position information of the external speakers obtained by the at least one positioning module.

The positioning module can be a Two Way Ranging (TWR) module which obtains position information of the external speakers by a TWR method. The TWR module can be disposed inside a housing of the display device. The device can also determine a speaker type of each of the external speakers based on the position information of the external speakers and transmit the audio signal corresponding to the speaker type of each external speaker. In addition, the speaker type includes at least one of a center speaker, a front speaker, and a rear speaker, for example.

The device can also periodically determine the speaker type of each external speakers. The position information of the external speakers can include the distance between the at least one positioning module and the external speaker, and the controller can determine the speaker type of each external speaker, based on the distance between the at least one positioning module and the external speaker.

Further, the display device can include one positioning module not disposed at an intermediate point of the horizontal length of the display device, but at a point closer to a rear surface of the display device than the intermediate point of the vertical length of the display device, and the controller can determine the type of the external speakers, based on the position information of the plurality of external speakers obtained by the positioning module.

Also, if the positioning module is disposed on the left of the intermediate point of the horizontal length of the display device, the controller determines the external speaker of the plurality of external speakers, having the closest distance from the positioning module, as a front speaker and determine the external speaker of the plurality of external speakers, having the farthest distance from the positioning module, as a rear speaker.

The front speaker includes a left front speaker and a right front speaker, and the rear speaker includes a left rear speaker and a right rear speaker. Further, the positioning module can be disposed at the left point of an intermediate point of the horizontal length of the display device, and the controller can determines the external speaker of the front speakers, having a closer distance from the positioning module, as the left front speaker and determine the external speaker of the rear speakers, having a closer distance from the positioning module, as the left front speaker.

The display device can also include a plurality of positioning modules obtaining the position information of the predetermined number of external speakers for each of the plurality of positioning modules. The display device can also include a plurality of positioning modules obtaining the position information of the external speakers in the predetermined order.

The plurality of positioning modules device can include a first positioning module disposed at an intermediate point of the horizontal length of the display device, and a second positioning module and a third positioning module disposed on both sides of the first positioning module, the predetermined number of the first positioning module can be 1, and the predetermined numbers of the second positioning module and the third positioning module can be 2.

The device can also determine the center speaker based on the position information obtained by the first positioning module, determine the two front speakers based on the position information obtained by the second positioning module, and determine two rear speakers based on the position information obtained by the third positioning module. Further, the second positioning module can obtain the position information of each of the two external speakers of the external speakers except the center speaker, having the closest distance from the second positioning module, and if the second positioning module is disposed at the left point of the intermediate point of the horizontal length of the display device, the controller can determine the external speaker of two external speakers, having a closer distance from the second positioning module, as the left front speaker and determine the other of the two external speakers as the right front speaker.

The third positioning module can also obtain the position information of each of the two external speakers of the external speakers except the center speaker and the front speaker, having the closest distance from the third positioning module, and if the third positioning module is disposed at the right point of the intermediate point of the horizontal length of the display device, the controller can determine an external speaker of the two external speakers, having the closer distance from the third positioning module, as the right rear speaker and determines the other of the two external speakers as the left rear speaker.

Advantageous Effects

According to an embodiment of the present disclosure, there is an advantage in that stereophonic sound can be provided regardless of a change in the position of an external speaker.

According to an embodiment of the disclosure, there is an advantage in minimizing the error in the recognized position of the external speaker.

According to an embodiment of the present disclosure, there is an advantage in being in capable of minimizing recognition errors due to obstacles existing between the display device and the external speaker.

According to an embodiment of the present disclosure, the disposition of the module for recognizing the position of the external speaker is free, and thus there is an advantage in that restrictions in terms of the design of the display device are minimized.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 9 is a graph illustrating phase values according to the recognizable angles of the positioning module.

FIGS. 13 and 14 are tables including position information of an external speaker obtained by the positioning module using the PDOA method.

FIG. 15 is a table comprising position information of an external speaker obtained using the TWR method.

DETAILED DESCRIPTION OF THE INVENTION

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function. Terms containing ordinal numbers, such as first and second may be used to describe various components, but the components are not limited by the terms. Terms are used only to distinguish one component from another.

Figure 1:
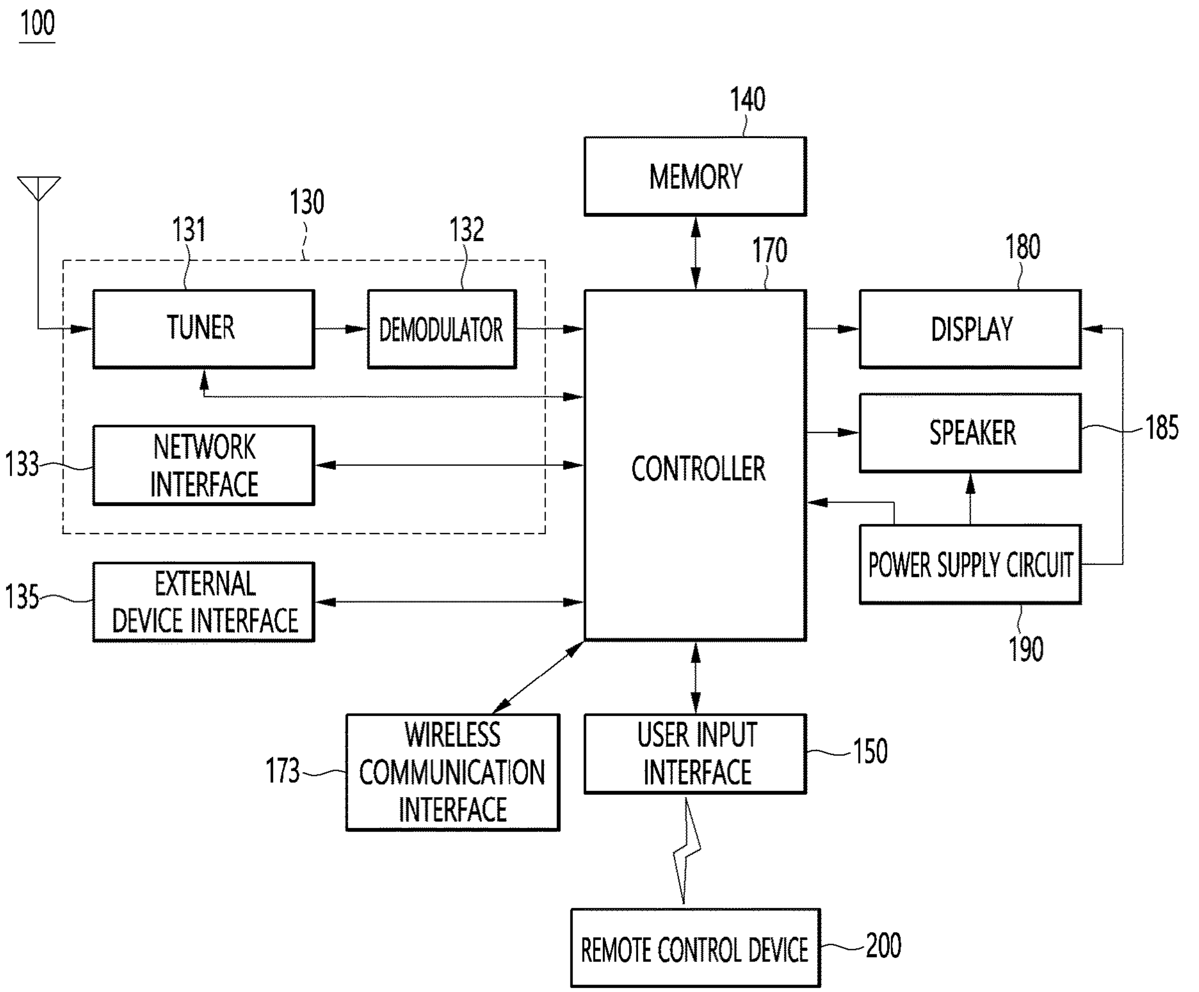
FIG. 1 is a block diagram showing a configuration of a display device according to an embodiment of the present disclosure.

FIG. 1 is a block diagram showing a configuration of a display device according to an embodiment of the present disclosure. FIG. 1 illustrates a display device 100 including a broadcast receiver 130, an external device interface 135, a memory 140, a user input interface 150, a controller 170, a wireless communication interface 173, a display 180, a speaker 185, and a power supply circuit 190.

As shown, the broadcast receiving unit 130 includes a tuner 131, a demodulator 132, and a network interface 133. The tuner 131 can select a specific broadcast channel according to a channel selection command. In addition, the tuner 131 can receive a broadcast signal for the selected specific broadcast channel. Also, the demodulator 132 can separate the received broadcast signal into an image signal, an audio signal, and a data signal related to a broadcast program, and restore the separated image signal, audio signal, and data signal to a format capable of being output.

Further, the network interface 133 provides an interface for connecting the display device 100 to a wired/wireless network including an Internet network. In particular, the network interface 133 can transmit or receive data to or from other users or other electronic devices through a connected network or another network linked to the connected network.

The network interface 133 can also access a predetermined web page through the connected network or the other network linked to the connected network. That is, it is possible to access a predetermined web page through a network, and transmit or receive data to or from a corresponding server. In addition, the network interface 133 can receive content or data provided by a content provider or a network operator. That is, the network interface 133 can receive content such as movies, advertisements, games, VOD, and broadcast signals and information related thereto provided from a content provider or a network provider through a network.

In addition, the network interface 133 can receive update information and update files of firmware provided by the network operator, and transmit data to an Internet or content provider or a network operator. The network interface 133 can also select and receive a desired application from among applications that are open to the public through a network.

Further, the external device interface 135 can receive an application or a list of applications in an external device adjacent thereto, and transmit the same to the controller 170 or the memory 140. The external device interface 135 can also provide a connection path between the display device 100 and an external device. In addition, the external device interface 135 can receive one or more of images and audio output from an external device connected to the display device 100 in a wired or wireless manner, and transmit the same to the controller 170. The external device interface 135 may include a plurality of external input terminals such as an RGB terminal, one or more High Definition Multimedia Interface (HDMI) terminals, and a component terminal.

The image signal of the external device input through the external device interface unit 135 can also be output through the display 180, and the audio signal of the external device input through the external device interface 135 can be output through the speaker 185. The external device connectable to the external device interface 135 may be any one of a set-top box, a Blu-ray player, a DVD player, a game machine, a sound bar, a smartphone, a PC, a USB memory, and a home theater, but this is only an example.

In addition, a part of content data stored in the display device 100 can be transmitted to a selected user among a selected user or a selected electronic device among other users or other electronic devices registered in advance in the display device 100. Further, the memory 140 can store programs for signal processing and control of the controller 170, and may store images, audio, or data signals, which have been subjected to signal-processed.

In addition, the memory 140 can perform a function for temporarily storing images, audio, or data signals input from an external device interface 135 or the network interface 133, and store information on a predetermined image through a channel storage function. The memory 140 can also store an application or a list of applications input from the external device interface 135 or the network interface 133.

The display device 100 can play back a content file (a moving image file, a still image file, a music file, a document file, an application file, or the like) stored in the memory 140 and provide the same to the user. Further, the user input interface 150 can transmit a signal input by the user to the controller 170 or a signal from the controller 170 to the user. For example, the user input interface 150 can receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or can perform processing to transmit the control signal from the controller 170 to the remote control device 200.

In addition, the user input interface 150 can transmit a control signal input from a local key such as a power key, a channel key, a volume key, and a setting value to the controller 170. The image signal image-processed by the controller 170 can be input to the display 180 and displayed as an image corresponding to a corresponding image signal. Also, the image signal image-processed by the controller 170 can be input to an external output device through the external device interface 135.

The audio signal processed by the controller 170 can be output to the speaker 185. Also, the audio signal processed by the controller 170 can be input to the external output device through the external device interface 135. In addition, the controller 170 can control the overall operation of the display device 100.

In addition, the controller 170 can control the display device 100 by a user command input through the user input interface 150 or an internal program and connect to a network to download an application a list of applications or applications desired by the user to the display device 100. The controller 170 can allow the channel information or the like selected by the user to be output through the display 180 or the speaker 185 along with the processed image or audio signal.

In addition, the controller 170 can output an image signal or an audio signal through the display 180 or the speaker 185, according to a command for playing back an image of an external device through the user input interface 150, the image signal or the audio signal being input from an external device, for example, a camera or a camcorder, through the external device interface 135.

Further, the controller 170 can allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this instance, an image being displayed on the display 180 can be a still image or a moving image, and can be a 2D image or a 3D image.

In addition, the controller 170 can allow content stored in the display device 100, received broadcast content, or external input content input from the outside to be played back, and the content can have various forms such as a broadcast image, an external input image, an audio file, still images, accessed web screens, and document files.

The wireless communication interface 173 can communicate with an external device through wired or wireless communication. The wireless communication interface 173 can perform short range communication with an external device. To this end, the wireless communication interface 173 can support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 can support wireless communication between the display device 100 and a wireless communication system, between the display device 100 and another display device 100, or between the display device 100 and a network in which the display device 100 (or an external server) is located through wireless area networks. The wireless area networks can be wireless personal area networks.

Here, the other display device 100 can be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 can detect (or recognize) a wearable device capable of communication around the display device 100. Furthermore, when the detected wearable device is an authenticated device to communicate with the display device 100 according to the present disclosure, the controller 170 can transmit at least a portion of data processed by the display device 100 to the wearable device through the wireless communication interface 173. Therefore, a user of the wearable device can use data processed by the display device 100 through the wearable device.

The display 180 can convert image signals, data signals, and OSD signals processed by the controller 170, or image signals or data signals received from the external device interface 135 into R, G, and B signals, and generate drive signals. Meanwhile, since the display device 100 shown in FIG. 1 is only an embodiment of the present disclosure, some of the illustrated components can be integrated, added, or omitted depending on the specification of the display device 100 that is actually implemented.

That is, two or more components can be combined into one component, or one component can be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 can receive an image through the network interface 133 or the external device interface 135 without a tuner 131 and a demodulator 132 and play back the same. For example, the display device 100 can be divided into an image processing device, such as a set-top box, for receiving broadcast signals or content according to various network services, and a content playback device that plays back content input from the image processing device.

In this instance, an operation method of the display device according to an embodiment of the present disclosure will be described below can be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 and 3. In particular, FIG. 2 is a block diagram of a remote control device according to an embodiment of the present disclosure, and FIG. 3 shows an actual configuration example of a remote control device 200 according to an embodiment of the present disclosure.

Figure 2:
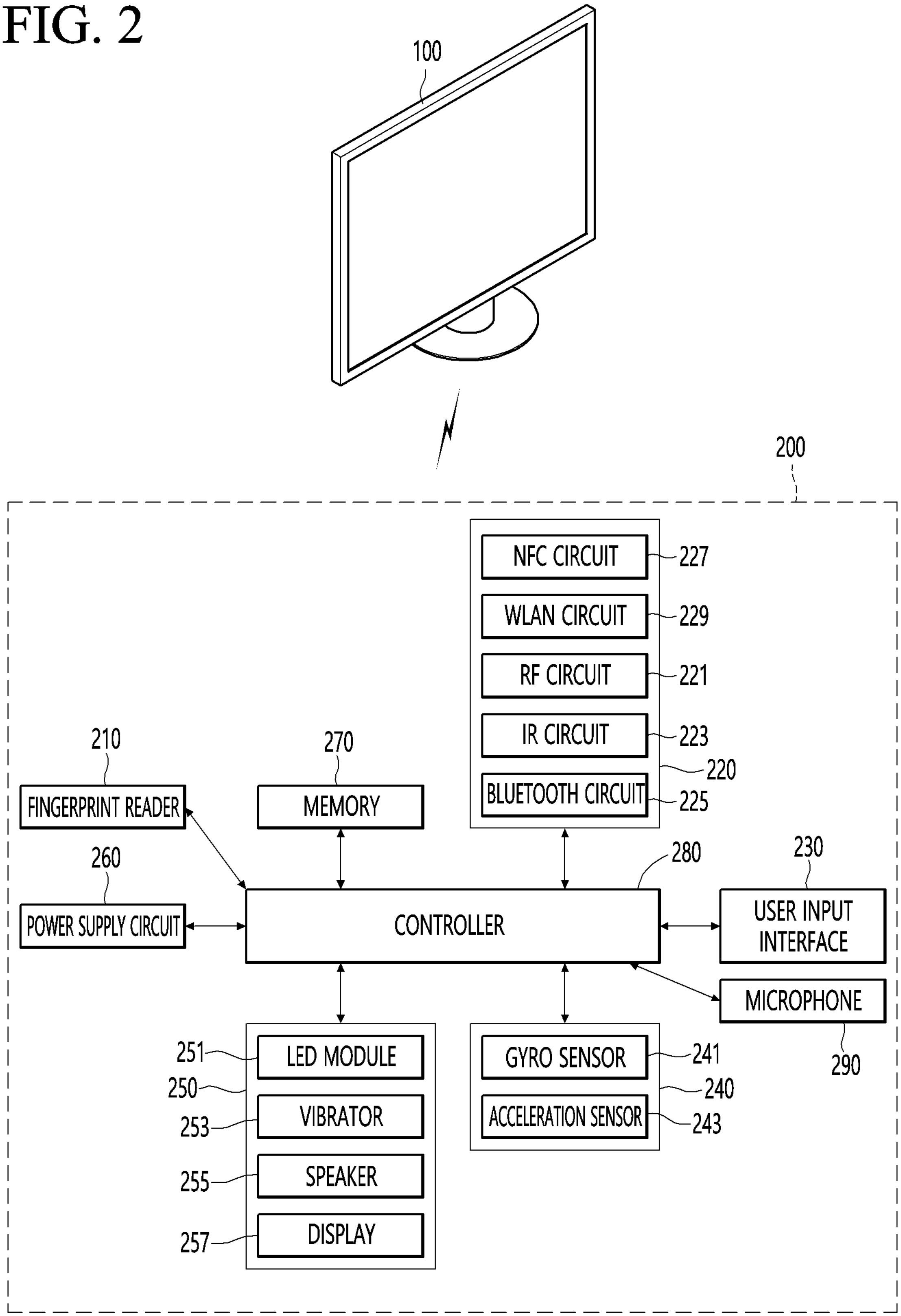
FIG. 2 is a block diagram of a remote control device according to an embodiment of the present disclosure.
Figure 3:
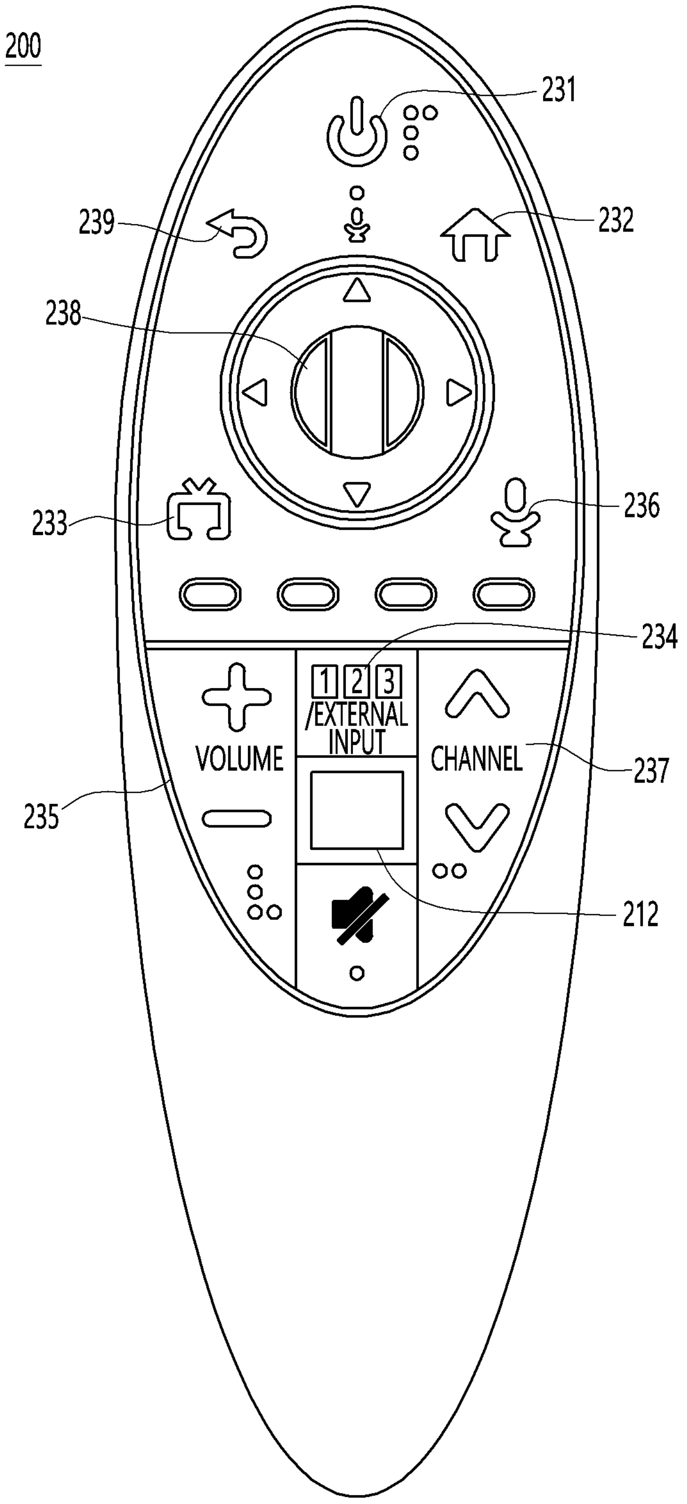
FIG. 3 shows an actual configuration example of a remote control device 200 according to an embodiment of the present disclosure.

First, referring to FIG. 2, the remote control device 200 includes a fingerprint reader 210, a wireless communication circuit 220, a user input interface 230, a sensor 240, an output interface 250, a power supply circuit 260, a memory 270, a controller 280, and a microphone 290. Referring to FIG. 2, the wireless communication circuit 220 can transmit and receive signals to and from any one of display devices according to embodiments of the present disclosure described above.

As shown, the remote control device 200 includes an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 can include a Bluetooth circuit 225 capable of transmitting and receiving signals to and from the display device 100 according to the Bluetooth communication standard. In addition, the remote control device 200 can include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 can transmit a signal containing information on the movement of the remote control device 200 to the display device 100 through the wireless communication circuit 220. In addition, the remote control device 200 can receive a signal transmitted by the display device 100 through the RF circuit 221, and transmit a command regarding power on/off, channel change, volume adjustment, or the like to the display device 100 through the IR circuit 223 as necessary.

The user input interface 230 can include a keypad, a button, a touch pad, a touch screen, or the like. The user can also input a command related to the display device 100 to the remote control device 200 by operating the user input interface 230. When the user input interface 230 includes a hard key button, the user can input a command related to the display device 100 to the remote control device 200 through a push operation of the hard key button. Details will be described with reference to FIG. 3.

Referring to FIG. 3, the remote control device 200 can include a plurality of buttons. In the example in FIG. 3, the plurality of buttons include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 is for recognizing a user's fingerprint. In one embodiment, the fingerprint recognition button 212 can enable a push operation, and thus can receive a push operation and a fingerprint recognition operation. The power button 231 is for turning on/off the power of the display device 100. The home button 232 is for moving to the home screen of the display device 100, and the live button 233 is for displaying a real-time broadcast program. Further, the external input button 234 is for receiving an external input connected to the display device 100, and the volume control button 235 is for adjusting the level of the volume output by the display device 100. Also, the voice recognition button 236 is for receiving a user's voice and recognizing the received voice. In addition, the channel change button 237 is for receiving a broadcast signal of a specific broadcast channel, the OK button 238 is for selecting a specific function, and the back-play button 239 is for returning to a previous screen.

A description will be given referring again to FIG. 2. When the user input interface 230 includes a touch screen, the user can input a command related to the display device 100 to the remote control device 200 by touching a soft key of the touch screen. In addition, the user input interface 230 can include various types of input mechanisms that can be operated by a user, such as a scroll key or a jog key, and the present embodiment does not limit the scope of the present disclosure.

In FIG. 2, the sensor 240 can include a gyro sensor 241 or an acceleration sensor 243, and the gyro sensor 241 can sense information regarding the movement of the remote control device 200. Also, the output interface 250 can output an image or audio signal corresponding to the operation of the user input interface 230 or a signal transmitted from the display device 100.

Further, the user can recognize whether the user input interface 230 is operated or whether the display device 100 is controlled through the output interface 250. For example, the output interface 250 can include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 can supply power to the remote control device 200 and stop power supply when the remote control device 200 has not moved for a predetermined time to reduce power consumption. The power supply circuit 260 can also restart power supply when a predetermined key provided in the remote control device 200 is operated.

Further, the memory 270 can store various types of programs and application data required for control or operation of the remote control device 200. When the remote control device 200 transmits and receives signals wirelessly through the display device 100 and the RF circuit 221, the remote control device 200 and the display device 100 transmit and receive signals through a predetermined frequency band.

In addition, the controller 280 of the remote control device 200 can store and refer to information on a frequency band capable of wirelessly transmitting and receiving signals to and from the display device 100 paired with the remote control device 200 in the memory 270. The controller 280 can also control all matters related to the control of the remote control device 200. The controller 280 can transmit a signal corresponding to a predetermined key operation of the user input interface 230 or a signal corresponding to the movement of the remote control device 200 sensed by the sensor 240 through the wireless communication unit 225. Also, the microphone 290 of the remote control device 200 can obtain a speech. A plurality of microphones 290 can be provided.

Figure 4:
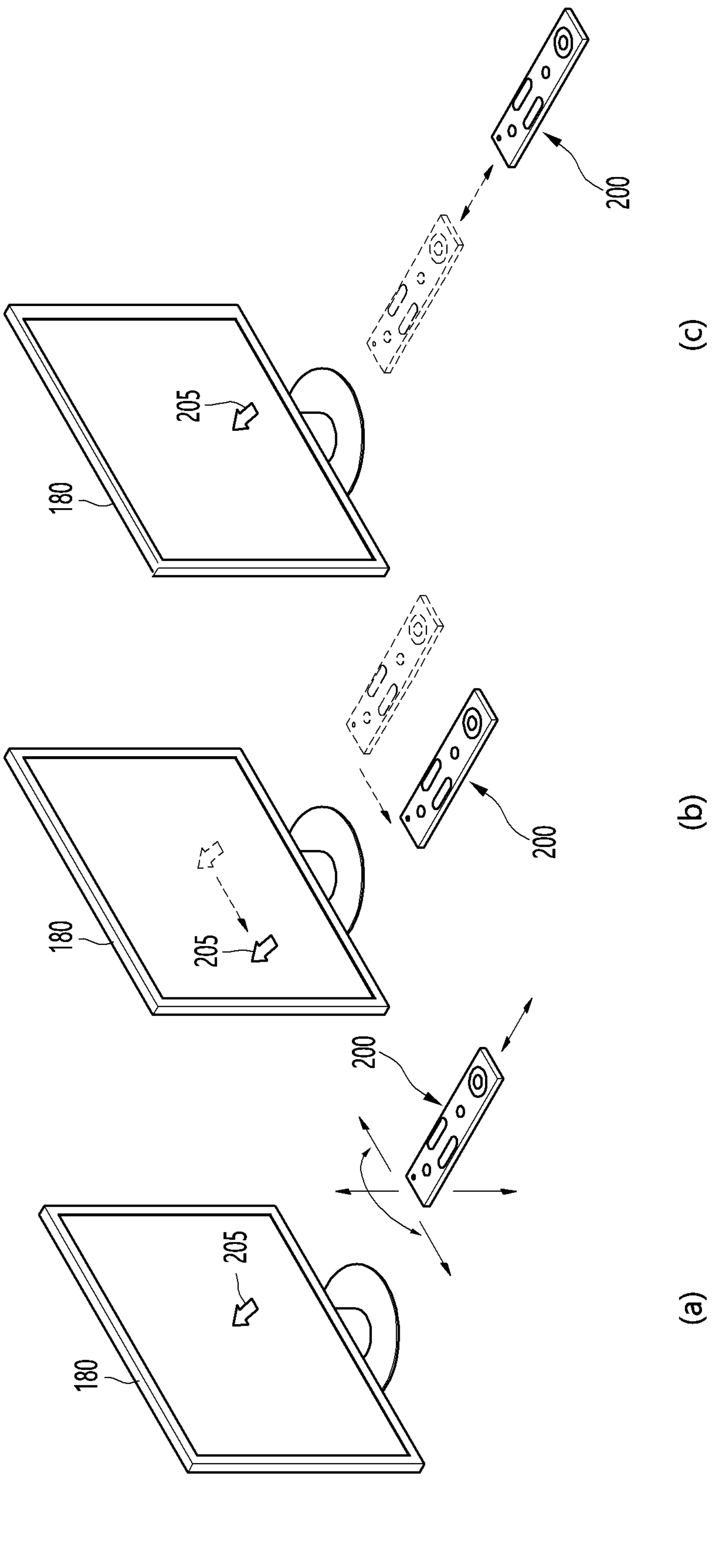
FIG. 4 shows an example of using a remote control device according to an embodiment of the present disclosure.

Next, a description will be given referring to FIG. 4. In particular, FIG. 4 shows an example of using a remote control device according to an embodiment of the present disclosure. That is, FIG. 4(*a*) illustrates that a pointer 205 corresponding to the remote control device 200 is displayed on the display 180.

The user can move or rotate the remote control device 200 up, down, left and right. The pointer 205 displayed on the display 180 of the display device 100 corresponds to the movement of the remote control device 200. As shown FIG. 4, the pointer 205 is moved and displayed according to movement of the remote control device 200 in a 3D space, so the remote control device 200 can be called a space remote control device.

FIG. 4(*b*) illustrates that that when the user moves the remote control device 200 to the left, the pointer 205 displayed on the display 180 of the display device 100 moves to the left correspondingly. Information on the movement of the remote control device 200 detected through a sensor of the remote control device 200 is transmitted to the display device 100. The display device 100 can calculate the coordinates of the pointer 205 based on information on the movement of the remote control device 200. The display device 100 can display the pointer 205 to correspond to the calculated coordinates.

FIG. 4(*c*) illustrates that a user moves the remote control device 200 away from the display 180 while pressing a specific button in the remote control device 200. Accordingly, a selected area in the display 180 corresponding to the pointer 205 can be zoomed in and displayed enlarged. Conversely, when the user moves the remote control device 200 to be close to the display 180, the selected area in the display 180 corresponding to the pointer 205 can be zoomed out and displayed reduced.

On the other hand, when the remote control device 200 moves away from the display 180, the selected area can be zoomed out, and when the remote control device 200 moves to be close to the display 180, the selected area can be zoomed in. Also, when a specific button in the remote control device 200 is being pressed, the recognition of up, down, left, or right movements can be excluded. That is, when the remote control device 200 moves away from or close to the display 180, the up, down, left, or right movements are not recognized, and only the forward and backward movements can be recognized. When a specific button in the remote control device 200 is not being pressed, only the pointer 205 moves according to the up, down, left, or right movements of the remote control device 200.

In addition, the movement speed or the movement direction of the pointer 205 can correspond to the movement speed or the movement direction of the remote control device 200. Further, a pointer refers to an object displayed on the display 180 in response to an operation of the remote control device 200. Accordingly, objects of various shapes other than the arrow shape shown in the Figures are possible as the pointer 205. For example, the object can be a concept including a dot, a cursor, a prompt, a thick outline, and the like. In addition, the pointer 205 can be displayed corresponding to any one point among points on a horizontal axis and a vertical axis on the display 180, and can also be displayed corresponding to a plurality of points such as a line and a surface.

In addition, at least one external speaker can be connected to the display device 100. An external speaker is a speaker that can be connected wirelessly or wired to the display device 100 and can refer to a speaker that can be selectively connected to the display device 100. For example, the external speaker has an audio output function, such as a smartphone, tablet PC, portable speaker, or sound bar and can include any device that can be connected to the display device 100 through Bluetooth or the like.

The display device 100 can be connected wirelessly or wired to at least one external speaker. For example, the display device 100 can be connected to at least one external speaker via Bluetooth through the wireless communication interface 173. The controller 170 can control sound corresponding to the image output by the display unit 180 to be output from at least one of the audio output unit 185 and an external speaker connected to Bluetooth.

Figure 5:
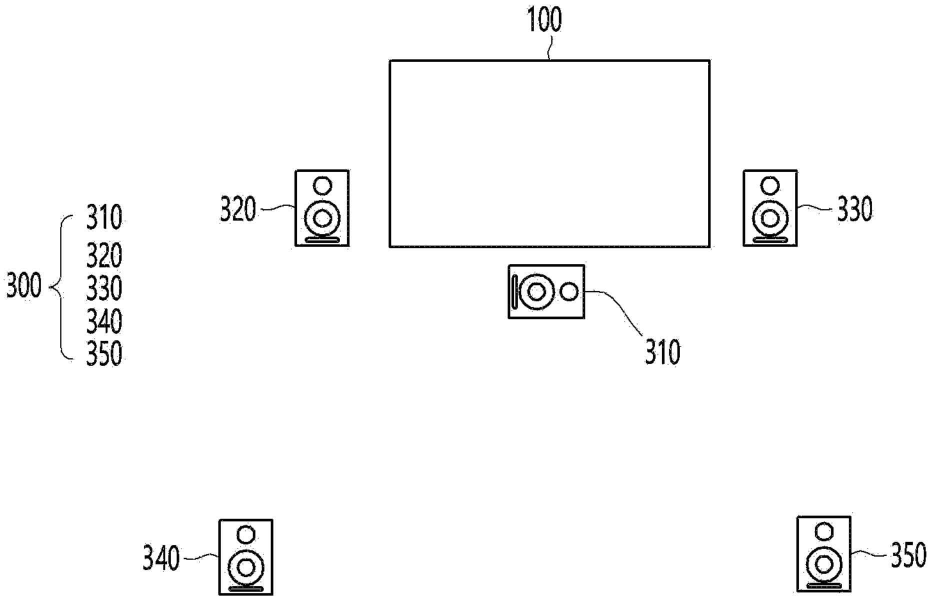
FIG. 5 is a view illustrating a display device and external speakers connected to the display device according to an embodiment of the present disclosure.

In more detail, FIG. 5 is a view illustrating a display device 100 and external speakers 300 connected to the display device 100 according to an embodiment of the present disclosure. As shown, the display device 100 can be connected to a plurality of external speakers 300 including first to fifth speakers 310, 320, 330, 340, and 350. As the display device 100 is connected to a plurality of external speakers 300, the display device 100 can provide stereophonic sound and surround effects.

In addition, the speaker types of the external speakers 300 can vary. The external speakers 300 can also output different audio according to the speaker type and accordingly, the audio simultaneously output by the external speakers 300 can form stereophonic sound. The speaker type of the external speaker 300 can be a center speaker, a front speaker, a rear speaker, or the like, but this is only an example. Also, the front speaker can include a left front speaker and a right front speaker, and the rear speaker can include a left rear speaker and a right rear speaker.

For example, the first speaker 310 in FIG. 5 can be a center speaker (i.e., disposed in the center with respect to the display device 100 in front of the user). The center speaker can be mainly for outputting voice audio among the audio of the content. Also, the second speaker 320 in FIG. 5 can be a left front speaker, and the third speaker 330 can be a right front speaker.

Further, the left front speaker and right front speaker can be disposed on the left and right sides, respectively, in front of the user. These front speakers can be mainly used to output music or audio with general sound effects applied among the audio of the content. The fourth speaker 340 in FIG. 5 can be a left rear speaker, and the fifth speaker 550 can be a right rear speaker.

The left rear speaker and the right rear speaker can be speakers disposed on the left and right sides, respectively, behind the user. These rear speakers can mainly be used to output background sounds or audio with special sound effects applied among the audio of the content. The display device 100 can also transmit an audio signal corresponding to the speaker type of each of the external speakers 300.

In addition, the display device 100 can obtain in advance the type corresponding to each of the external speakers 300 and transmit an audio signal to each of the external speakers 300 based on the obtained type of the external speaker 300. In this instance, even when the positions of the external speakers 300 are changed, the audio signal is transmitted based on the type of the external speaker 300 obtained in advance, so there is a problem in that stereophonic sound cannot be properly transmitted.

For example, even when the positions of the second speaker 320 and the fourth speaker 330 in FIG. 5 are switched, the second speaker 320 still outputs audio from the left front speaker and the fourth speaker 330 still has the problem of outputting audio from the left rear speaker. Accordingly, the position and disposition of the external speaker 300 had to be fixed, and it can be difficult to move the external speaker 300 from the existing position thereof.

Accordingly, the present disclosure provides a display device 100 that determines the speaker type based on the position information of each external speaker 300 and transmits an audio signal corresponding to the speaker type.

In more detail, the display device 100 can include a display 180 displaying an image of content, a wireless communication interface 173 that wirelessly connects to a plurality of external speakers, and at least one positioning device 400 (FIG. 6) that obtains position information of the plurality of external speakers, and a controller 170 that transmits an audio signal of content to each of the external speakers based on the position information of the external speakers obtained by at least one positioning module.

The positioning module can be an Ultra Wide Band (UWB) module. Specifically, the positioning module can be a Phase Difference of Arrival (PDoA) module that obtains position information of the external speaker 300 using the PDoA method or a TWR module that acquires position information of the external speaker 300 using the TWR method.

Figure 6:
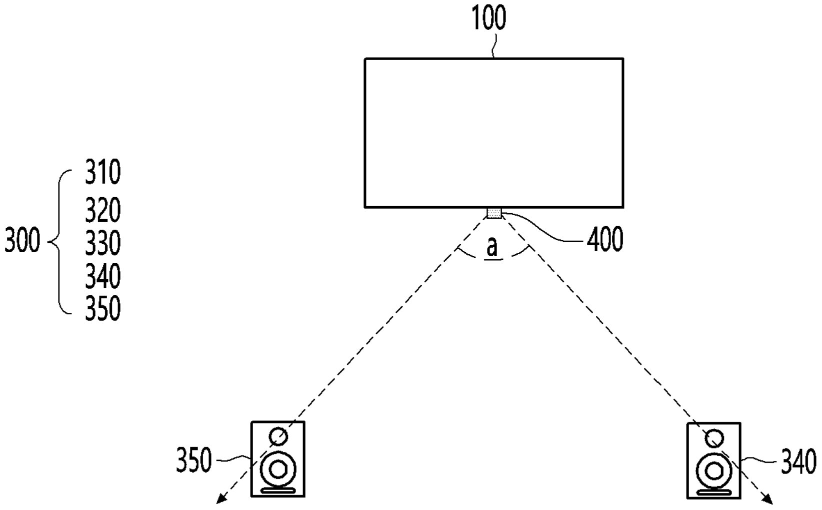
FIG. 6 is a view illustrating an operation of a display device obtaining position information of an external speaker according to an embodiment of the present disclosure.

A method for the display device 100 to obtain position information of the external speaker 300 using the PDoA method is described with reference to FIG. 6. In particular, FIG. 6 is a view illustrating an operation of a display device obtaining position information of an external speaker according to an embodiment of the present disclosure. The positioning module 400 in FIG. 6 can be a PDoA module. The positioning module 400 can recognize the external speakers 300 within the recognition angle range (a) and recognize the position information of the external speakers 300.

In FIG. 5, the fourth speaker 340 is a left rear speaker, and the fifth speaker 350 is a right rear speaker. However, in FIG. 6, it can be seen that the positions of the fourth speaker 340 and the fifth speaker 350 have changed. In addition, the positioning module 400 can obtain the fifth speaker 350 as the left rear speaker if the position of the fifth speaker 350 is obtained within the area set as the left rear area. Additionally, if the position of the fourth speaker 340 is acquired within the area set as the right rear area, the fourth speaker 340 can be obtained as the right rear speaker.

Accordingly, the display device 100 can transmit an audio signal corresponding to the left rear speaker to the fifth speaker 350 and transmit an audio signal corresponding to the right rear speaker to the fourth speaker 340. In other words, by using the positioning module 400, the display device 100 can process and output an audio signal by reflecting a change in the position of the external speaker 300.

Figure 7:
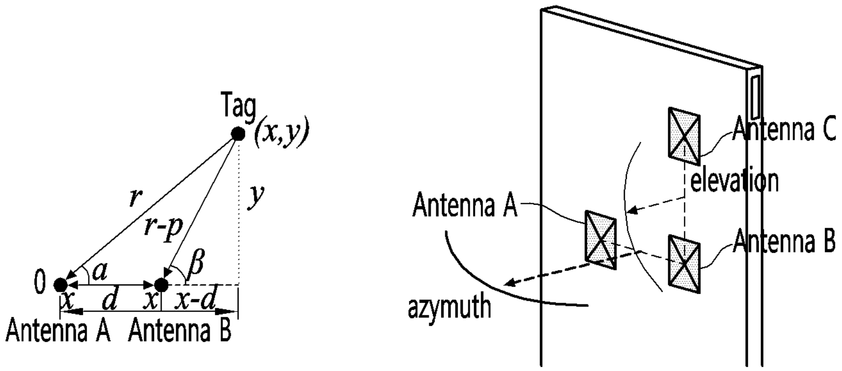
FIG. 7 is a view to explain a method of obtaining position information using the PDoA method.

Next, FIG. 7 is a view to explain a method of obtaining position information using the PDoA method. In particular, the PDoA method is for checking the distance and angular position of a tag using triangulation. A tag can be an object for obtaining position information.

To apply the PDoA method in a two-dimensional plane, two or more antennas can be required. For example, using the distance d between Antenna A and Antenna B, the distance r between Antenna A and Tag, and the distance y between Antenna B and Tag, the azimuth of the tag can be obtained. Additionally, in order to apply the PDoA method in a 3D plane, three or more antennas can be required. For example, the azimuth of a tag can be obtained using Antenna A and Antenna B, and the beam pattern can be formed using Antenna B and Antenna C and thus elevation altitude can be obtained.

The positioning module 400 can include two or more antennas to recognize the position of the external speaker 300 using the PDoA method. When the positioning module 400 includes three antennas, the position of the external speaker 300 can be recognized more accurately than when the positioning module 400 includes two antennas. Also, when the positioning module 400 includes two antennas, the manufacturing costs can be reduced and the amount of computation can be minimized compared to when the positioning module 400 includes three antennas.

Figure 8:
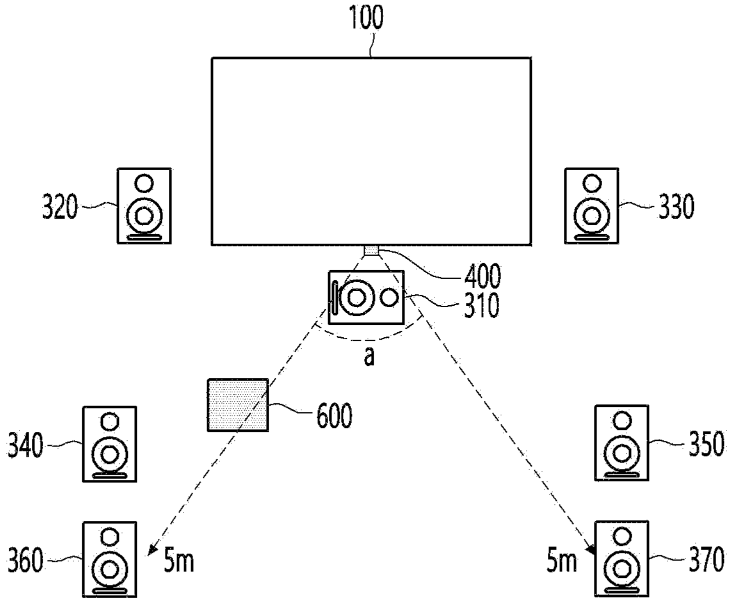
FIG. 8 is a view illustrating an operation in which a display device recognizes an external speaker using the PDoA method according to an embodiment of the present disclosure.

If the display device 100 does not use the elevation altitude of the external speakers 300 to determine the speaker type, the positioning module 400 can also be designed to include two antennas. In particular, FIG. 8 is a view illustrating an operation in which a display device 100 recognizes an external speaker using the PDoA method according to an embodiment of the present disclosure. The PDoA method has a limit to the angle range that the positioning module 400 can measure. The measurable angle range can be within which the positioning module 400 can recognize the external speaker 300. For example, the angle range (a) that the positioning module 400 can measure can be 60°.

Additionally, in order to recognize the speaker 300 using the PDoA method, the Line Of Sight (LOS) condition must be satisfied, which can mean that there should be no obstacle 600 between the positioning module 400 and the external speaker 300. The positioning module 400 may not recognize the second speaker 320, third speaker 330, fourth speaker 340, and fifth speaker 350 located outside the measurable angle range.

In addition, although the positioning module 400 is located within a measurable angle range, the positioning module 400 may not recognize the sixth speaker 360 with an obstacle 600 disposed between the positioning module 400 and the sixth speaker 360. The positioning module 400 is located within a measurable angle range among the first to seventh speakers 310, 320, 330, 340, 350, 360, and 370, and only the seventh speaker 370 that does not have an obstacle 600 disposed between the seventh speaker and the positioning module 400 can be recognized.

In addition, in order to recognize the external speaker 300 using the PDoA method, the positioning module 400 has to be disposed to protrude a predetermined length or more from the housing of the display device 100. In more detail, FIG. 9 is a graph illustrating phase values according to the recognizable angles of the positioning module 400. The horizontal axis of FIG. 9 is a recognizable angle of the positioning module 400, and the vertical axis is a phase value.

In particular, FIG. 9(*a*) is a graph measuring the phase value according to the recognizable angle when the positioning module 400 protrudes 12 mm toward the bottom of the display 180, and FIG. 9(*b*) is a graph measuring the phase value according to the recognizable angle when the positioning module 400 protrudes 4 mm toward the bottom of the display 180.

In addition, FIG. 9(*a*) may be a graph in which the phase difference is maintained at a predetermined level or more and the phase value can be easily distinguished. Also, FIG. 9(*b*) may be a graph in which a section where phases overlap occurs, making it difficult to distinguish phase values. From this, it can be seen that the PDoA module that recognizes the external speaker 300 using the PDoA method has to be disposed to protrude by a predetermined length or more from the housing of the display device 100.

When the positioning module 400 is disposed to protrude from the housing of the display device 100, the external speaker recognition performance can be degraded due to the external structure. Additionally, there is a problem in that aesthetics are deteriorated in terms of an outer appearance design. Accordingly, the present disclosure provides a display device 100 that recognizes an external speaker 300 using a Two Way Ranging (TWR) method.

Figure 10:
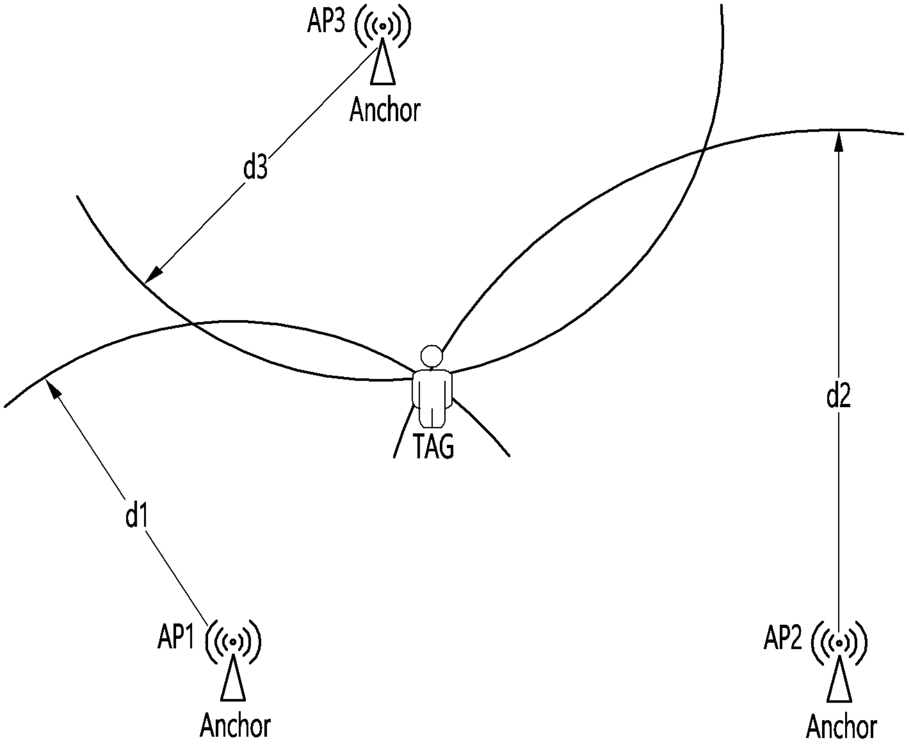
FIG. 10 is a view for explaining a method of obtaining position information using the TWR method.

In more detail, FIG. 10 is a view for explaining a method of obtaining position information using the TWR method. The TWR method is a method in which an anchor obtains position information of a tag using Time Of Flight (ToF). First, the distance d1, d2, d3 between the tag and anchor is obtained using ToF. Then, a circle is drawn with the position of the anchor as the center and the measured distances d1, d2, d3 as the radius. Then, the point where all circles intersect is obtained as the position of the tag.

Figure 11A:
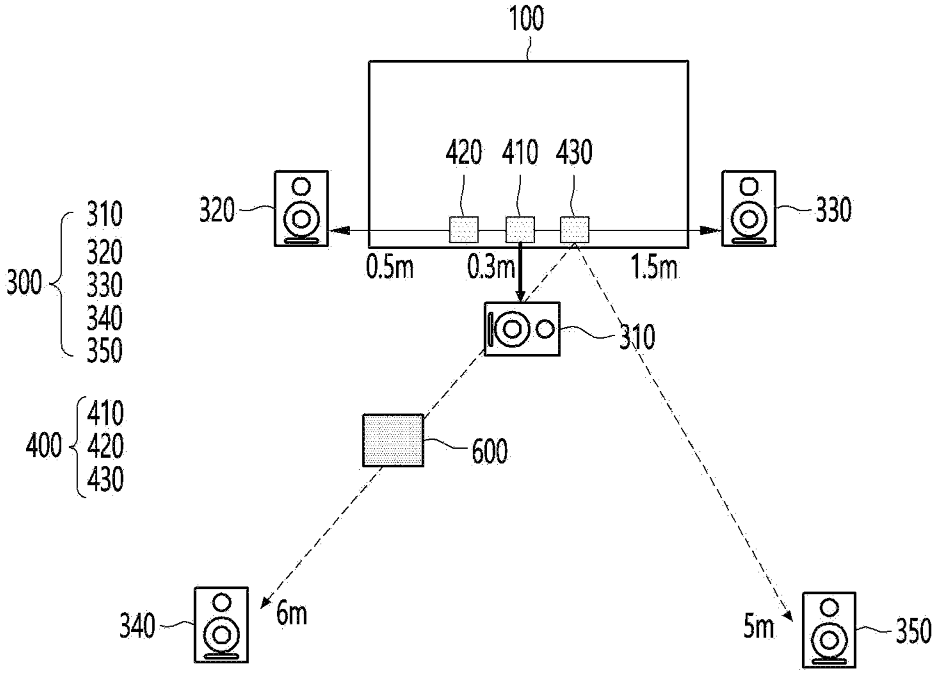
FIGS. 11A and 11B are views illustrating an operation in which a display device recognizes an external speaker using a TWR method using a plurality of positioning modules.
Figure 11B:
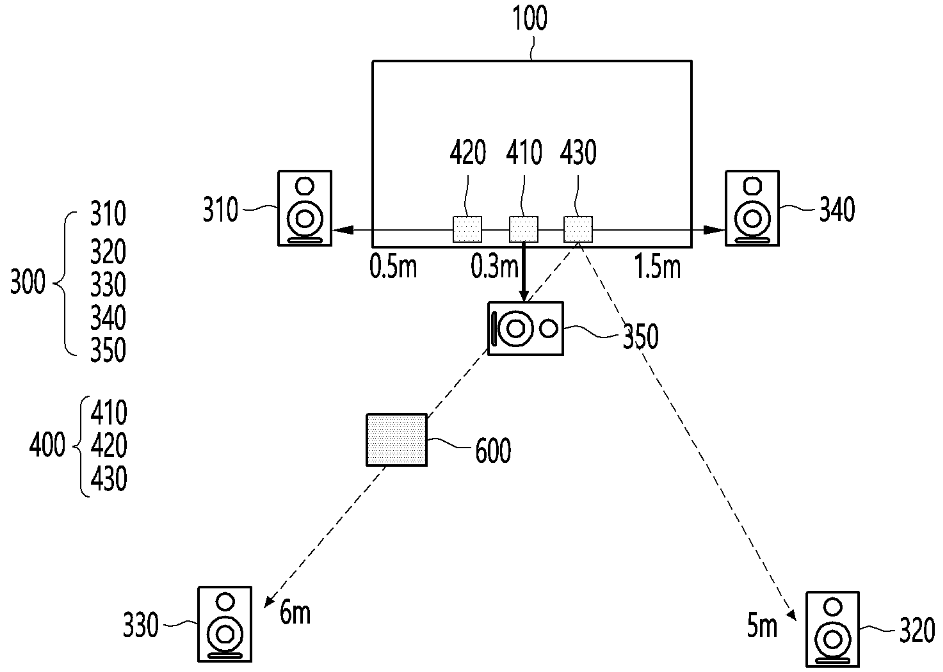

Next, FIGS. 11A and 11B are views illustrating an operation in which a display device 100 recognizes an external speaker using a TWR method using a plurality of positioning modules 400. In particular, the display device 100 can include a first positioning module 410, a second positioning module 420, and a third positioning module 430. The first to third positioning modules 410, 420, and 430 can obtain position information of the external speakers 300 using the TWR method. The position information of the external speakers 300 can include the distance between the positioning module 400 and the external speaker 300. Accordingly, the controller 170 can determine the speaker type of each of the external speakers 300 based on the distance between the positioning module 400 and the external speaker 300.

In more detail, the first positioning module 410 can recognize the center speaker, the second positioning module 420 can recognize the front speakers 320 and 330, and the third positioning module 430 can recognize the rear speakers 320 and 330.

Thus, the plurality of positioning modules 400 can obtain position information of a predetermined number of external speakers 300 for each positioning module. Additionally, the plurality of positioning modules 400 can obtain position information of the external speakers 300 in a predetermined order. For example, the plurality of positioning modules 400 can obtain the position information of one, two, and two external speakers, respectively, in the order of the first positioning module 410, the second positioning module 420, and the third positioning module 430.

In more detail, FIG. 11A illustrates the first positioning module 410 is disposed at the midpoint of the horizontal length of the display device 100, the second positioning module 420 and the third positioning module 430 disposed on both sides of the first positioning module 410, and a predetermined number of the first positioning module can be 1, and predetermined numbers of the second positioning module and the third positioning module can be 2.

Hereinafter, the position where the positioning module 400 is disposed will be described based on the front direction of the display device 100. For example, when the positioning modules 400 are disposed as illustrated in FIG. 11, the second positioning module 420 is disposed to the left of the first positioning module 410, and the third positioning module 430 is disposed on the right of the first positioning module 410. In general, the center speaker can be disposed in the front surface of the midpoint of the horizontal length of the display device 100. Thus, the first positioning module 410 can be disposed at the midpoint of the horizontal length of the display device 100. The first positioning module 410 can obtain position information of the external speaker disposed at the closest distance among the external speakers 300. Additionally, the controller 170 can determine the center speaker based on the position information obtained by the first positioning module 410.

For example, the first positioning module 410 can obtain position information of the first speaker 310 of the external speakers 300 having the closest distance from the first positioning module 410. The controller 170 can determine the first speaker 310 as a center speaker based on the position information obtained by the first positioning module 410.

In general, front speakers include a left front speaker and a right front speaker. The left front speaker is disposed in the left front side of the user and the right front speaker is disposed in the right front of the user. The second positioning module 420 can be disposed at a point other than the midpoint of the horizontal length of the display device 100. For example, the second positioning module 420 can be disposed to the left or right of the first positioning module 410.

The second positioning module 420 can obtain position information of the two external speakers of the remaining external speakers excluding the center speaker having the closest distance from the second positioning module 420. For example, the second positioning module 420 can obtain position information of the second speaker 320 and the third speaker 330. Accordingly, the controller 170 can determine the second speaker 320 and the third speaker 330 as front speakers.

In addition, if the second positioning module 420 is disposed at the left point of the intermediate point of the horizontal length of the display device 100, the controller can determine the external speaker of two external speakers, having a closer distance from the second positioning module 420, as the left front speaker and determine the other of the two external speakers as the right front speaker. For example, the controller 170 determines the second speaker 320 whose distance from the second positioning module 420 is 0.5 m as a left front speaker and the third speaker 330 whose distance from the second positioning module 420 is 1.5 m as a right front speaker.

In general, rear speakers include a left rear speaker and a right rear speaker. The left rear speaker is disposed on the rear left side of the user and the right rear speaker is disposed to the rear right of the user. In addition, the third positioning module 430 can be disposed at a point other than the midpoint of the horizontal length of the display device 100. For example, the third positioning module 430 can be disposed to the left or right of the first positioning module 410.

Further, the third positioning module 430 can obtain position information of the two external speakers of the remaining external speakers excluding the center speaker and the front speaker having the closest distance from the third positioning module 430. For example, the third positioning module 430 can obtain position information of the fourth speaker 340 and the fifth speaker 350. Accordingly, the controller 170 can determine the fourth speaker 340 and the fifth speaker 350 as rear speakers.

In addition, as illustrated in the FIG. 11A, if the third positioning module 430 is disposed at a right point of the midpoint of the horizontal length of the display device 100, the controller 170 can determine an external speaker of the two external speakers having a closer distance from the third positioning module as the right rear speaker, and determine the other one of the two external speakers as the left front speaker. For example, the controller 170 can determine the fifth speaker 350 whose distance from the third positioning module 430 is 5 m as the right rear speaker and determine the fourth speaker 340 whose distance from the third positioning module 430 is 6 m as the left rear speaker.

In addition, the third positioning module 430 can recognize the external speaker 300 even if there is an obstacle 600 between the external speaker 300 and the third positioning module. Accordingly, the third positioning module 430 can recognize the fourth speaker 340.

Next, FIG. 11B illustrates the disposition of the external speakers 300 has changed. Accordingly, the controller 170 can determine the speaker type of each external speaker 300 based on the position information obtained by the positioning module 400 while the disposition of the external speakers 300 is changed. The method of determining the speaker type of each external speaker 300 by the controller can be the same as that described with reference to FIG. 11A.

In FIG. 11B, the controller 170 can determine the speaker type of the first speaker 310 as a left front speaker, determine the speaker type of the second speaker 320 as the right rear speaker, determine the speaker type of the third speaker 330 as the left rear speaker, determine the type of the fourth speaker 340 as the right front speaker, and determine the type of the fifth speaker 350 as a center speaker.

Accordingly, the controller 170 can determine each speaker type even if the disposition of the external speakers 300 is changed, and thus can transmit the audio corresponding to the speaker type. Accordingly, the display device 100 according to the embodiment of the present disclosure can provide a stereoscopic sound and surround effect even when the disposition of the external speakers 300 is changed.

In addition, the controller 170 can periodically determine the speaker type of each external speaker 300. In more detail, the positioning module 400 can periodically obtain the position information of the external speakers 300. Accordingly, the display device 100 can maintain a stereophonic sound and surround effect.

In addition, the positioning module 400, which recognizes the external speaker 300 using the TWR method, can recognize the external speaker 300 even if it is disposed in the housing of the display device 100. In other words, the TWR module can be disposed inside the housing of the display device 100. Accordingly, the impact on the recognition performance of the external speaker 300 by the external structure can be minimized. In addition, because the positioning module 400 is not visible from the front of the display device 100, there is an advantage of increasing the aesthetic.

Figure 12:
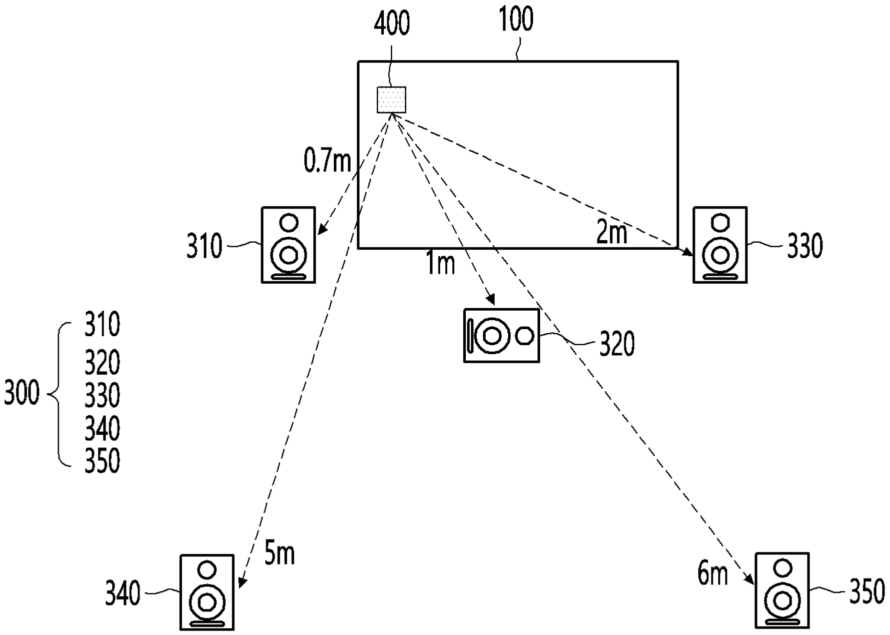
FIG. 12 is a view for explaining how the display device recognizes an external speaker by the TWR method using a positioning module.

Next, FIG. 12 is a view for explaining how the display device 100 recognizes an external speaker by the TWR method using a positioning module. The display device 100 can include one positioning module 400 to recognize an external speaker using the TWR method.

The one positioning module 400 can be disposed in a position other than the center of the display device 100. Specifically, the positioning module 400 is not disposed at an intermediate point of the horizontal length of the display device 100, but at the point closer to a rear surface of the display device 100 than the intermediate point of the vertical length of the display device 100. For example, the positioning module 400 can be disposed at the left position of the intermediate point of the horizontal length of the display device 100, as shown in FIG. 12, and can be disposed at the point closer to the rear surface of the display device 100 than the intermediate point of the vertical length of the display device 100.

Further, the positioning module 400 can determine the type of speaker from the external speaker 300, which is closest to the positioning module 400. If the positioning module 400 is disposed at the left point of the intermediate point of the horizontal direction of the display device 100, as shown in FIG. 12, the controller 170 can determine the external speaker 300 of the external speakers 300 having the closest distance from the positioning module 400 as the left front speaker, and determine the external speaker 300 of the external speakers 300 having the farthest distance from the positioning module 400 as the rear speaker.

In addition, the controller 170 can determine the external speaker 300 of the front speakers, having the closer distance from the positioning module as a left front speaker, and determine the external speaker 300 of the rear speakers, having a closer distance from the positioning module as a left rear speaker. Accordingly, the controller 170 can determine the first speaker 310, which is 0.7 m away from the positioning module 400, as the left front speaker, determine the second speaker 320, which is 1 m away from the positioning module 400, as the center speaker, determine the third speaker 330, which is 2 m away from the positioning module 400, as the right front speaker, determine the fourth speaker 340, which is 5 m away from the positioning module 400, as the left rear front speaker, and determine the fifth speaker 350, which is 6 m away from the positioning module 400, as the right rear front speaker.

Figure 14:
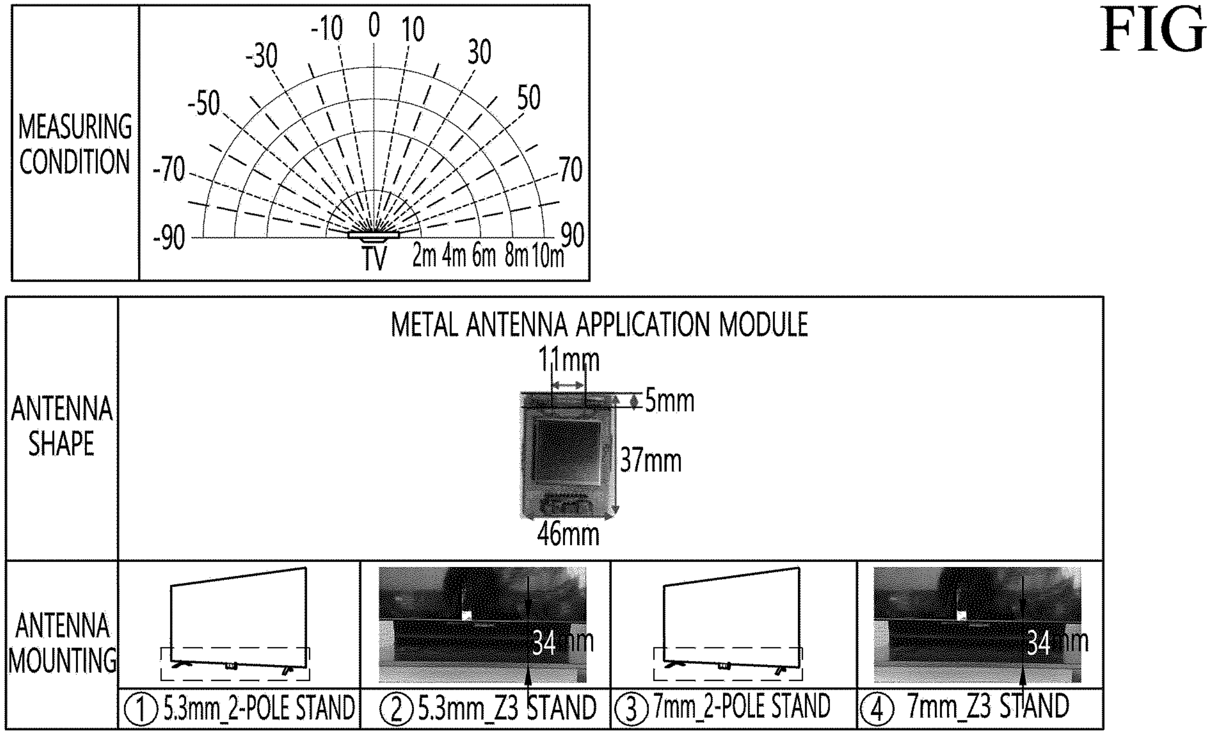

Next, FIGS. 13 and 14 are tables including position information of an external speaker obtained by the positioning module using the PDOA method. The positioning module 400 can obtain the position information of the external speaker 300 by the PDOA method using the PCB antenna, chip antenna or metal antenna.

The first to third data 1, data 2, data 3 include the angle of the external speaker 300 measured by the positioning module 400 at a location 5 m away from the external speaker 300. The angle of the external speaker 300 can be measured at an angle in the left or right direction based on the positioning module.

In addition, the first data 1 is the recognition result of the external speaker 300 of the positioning module 400 including a PCB antenna, the second data 2 is the recognition result of the external speaker 300 of the positioning module 400 including a chip antenna, and the third data 3 is the recognition result of the external speaker 300 of the positioning module 400 including the metal antenna.

The first data (data 1) will now be described in more detail. In particular, the vertical length of the PCB antenna can be 15 mm. Further, the positioning module 400 can be disposed to protrude by 15 mm or more in the lower direction of the display 180. From the first data 1, it can be seen that the difference between the angle of the outer speaker 300 measured by the positioning module 400 and the angle of the external speaker 300 actually positioned is 10° or less. From this, if the positioning module 400 including the PCB antenna protrudes by a length longer than the vertical length of the PCB antenna, it can be seen that the position information of the external speaker 300 obtained by the positioning module 400 is relatively accurate.

Next, the second data (data 2) will be described. The second data 2 is representing the result of the positioning module 400, which includes a chip antenna with a vertical length of 3.8 mm, acquiring position information of the external speaker 300. Referring to the second data, it can be seen that the difference between the angle of the external speaker 300 measured by the positioning module 400 and the angle at which the external speaker 300 is actually located exceeds 10°. From this, the positioning module 400 including the chip antenna can be seen that even if the positioning module protrudes longer than the length of the chip antenna, the accuracy of the position information obtained by the positioning module 400 is not relatively high.

In addition, it can be seen that the recognition rate for the external speaker 300 tends to have a low recognition rate when the display device 100 is coupled with a Z3 stand than when coupled with a 2-pole stand. In other words, it can be seen that the recognition rate of the external speaker 300 is affected by the external structure.

Next, the third data (data 3) will be described. In particular, the third data is representing the results of the positioning module 400, which includes a metal antenna with a vertical length of 5 mm, obtaining position information on the external speaker 300.

Referring to the third data, it can be seen that the difference between the angle of the external speaker 300 measured by the positioning module 400 and the angle at which the external speaker 300 is actually located exceeds 10°. In addition, it can be seen that the positioning module 400 cannot measure the angle where the external speaker 300 is located. Therefore, even if the positioning module 400 including the metal antenna protrudes to a length longer than the length of the metal antenna, the accuracy of the position information of the external speaker 300 obtained by the positioning module 400 is not relatively high.

In addition, according to the type of stand with which the display device 100 is coupled, the length to which the positioning module 400 protrudes can be limited. For example, if the type of the stand is a Z3 stand, the display 180 can be spaced 34 mm away from the upper surface of the support S1. Accordingly, the length of the positioning module 400 can be less than 34 mm in length that can protrude in the lower direction of the display 180. Therefore, the positioning module 400 can be difficult to protrude by 34 mm or more regardless of the antenna length. In other words, according to the type of stand, the positioning module 400 is limited to the protruding length, and accordingly, it can be difficult to obtain the exact position information of the external speaker 300.

Therefore, FIGS. 13 and 14 illustrate that in order for the positioning module 400 to have recognition rate at a certain level or more for the external speaker 300, there are restrictions such as having to consider the protrusion length of the positioning module 400, the type of antenna, and the type of stand.

Next, FIG. 15 is a table including position information of an external speaker obtained using the TWR method. The positioning module 400 can obtain the position information of the external speaker 300 by the TWR method using the UWB antenna.

The fourth and fifth data 4 and data 5 can include the maximum distance at which the positioning module 400 can recognize the external speaker 300. The fourth data can be on the positioning module 400 including two UWB antennas, and the fifth data can be on the positioning module 400 including one UWB antenna.

In addition, the positioning module 400 can be disposed inside the display device 100. For example, the positioning module 400 can be disposed at a 10 mm spaced position from the lower surface of the housing of the display device 100 inside the display device 100. In addition, the positioning module 400 can be disposed at a 5 mm spaced position from the display 180 within the display device 100. The disposition of the positioning module 400 is only an example, and the positioning module 400 can be disposed at one point of the display device 100. Accordingly, the positioning module 400 is not visible from the outside of the display device 100.

From the fourth and fifth data (data 4 and data 5), it can be confirmed that the maximum distance that the positioning module 400 can recognize is 10 m or more regardless of the angle at which the channel and external speaker 300 are disposed. In general, the user can use the display device 100 in a place spaced within 10 m with the display device 100 or dispose an external speaker 300. Accordingly, if the maximum distance that the positioning module 400 can recognize is 10 m or more, position information of the external speaker 300 can be obtained in most viewing environments.

In addition, the channel can be 9 ch or 5 ch. 9 ch is a mandatory channel using 7987.2 MHz frequency, and 5 ch can be an optional channel using 6489.6 MHz frequency. The display device 100 can use 9 ch or 5 ch according to the environment.

If the positioning module 400 obtains the position information of the external speaker 300 in the TWR method, there is an advantage that the position information of the external speakers 300 can be obtained regardless of the usage environment or the angle in which the external speakers 300 is disposed. In addition, the positioning module 400 can be disposed inside the housing of the display device 100. Accordingly, there is an advantage of increasing aesthetic in the design side of the display device 100.

What is claimed is:

1. A display device comprising:

a display unit configured to display image content;

a wireless communication interface configured to wirelessly connect with a plurality of external speakers spaced a distance from the display device;

at least one positioning module configured to obtain position information of the plurality of external speakers by identifying a spatial relationship between each external speaker and the display device, the positioning module comprising a Two Way Ranging (TWR) module configured to obtain the position information of the plurality of external speakers using a TWR method, the TWR module being disposed inside a housing of the display device; and a controller configured to transmit an audio signal to be output by the plurality of external speakers, based on the obtained position information of the plurality of external speakers.

2. The display device of claim 1, wherein the housing includes the display unit.

3. The display device of claim 1, wherein the controller is further configured to:

determine a speaker type of each external speaker among the plurality of external speakers based on the position information;

periodically determine the speaker type of each external speaker among the plurality of external speakers based on updated position information of the plurality of external speakers; and transmit the audio signal to be output corresponding to the determined speaker type of each external speaker among the plurality of external speakers, and wherein the speaker type includes at least one of a center speaker, a front speaker, and a rear speaker.

4. The display device of claim 1, wherein the position information of the plurality of external speakers includes a physical distance between the positioning module and a corresponding external speaker among the plurality of external speakers, wherein the controller is further configured to determine a speaker type of each external speaker among the plurality of external speakers, based on the physical distance between the at least one-positioning module and the external speaker among the plurality of external speakers, and wherein, when the positioning module is disposed at a left rear portion of the display device, offset from a horizontal centerline of the display device, the controller is further configured to:

determine a first external speaker among the plurality of external speakers, having a closest distance from the positioning module and a specific directional relationship relative to a front surface of the display device, as a front speaker, and determine a second external speaker among the plurality of external speakers, having a farthest distance from the positioning module and the specific directional relationship relative to the display device's front surface, as a rear speaker.

5. The display device of claim 1, wherein the display device includes one positioning module disposed at a position that is offset from a horizontal length centerline of the display device, and is closer to a rear surface of the display device than a vertical centerline of the display device, and wherein the controller is further configured to determine a type of the plurality of external speakers, based on the position information of the plurality of external speakers obtained by the positioning module.

6. The display device of claim 5, wherein the controller determines an external speaker among the plurality of external speakers, having a closest distance from the positioning module, as a front speaker and determines an external speaker among the plurality of external speakers, having a farthest distance from the positioning module, as a rear speaker.

7. The display device of claim 6, wherein the front speaker includes a left front speaker and a right front speaker, and the rear speaker includes a left rear speaker and a right rear speaker, and wherein if the position module is disposed at a point horizontally offset to a left from the horizontal centerline of the display device, the controller determines an external speaker of the front speakers, having a closer distance from the positioning module, as the left front speaker and determines an external speaker of the rear speakers, having a closer distance from the positioning module, as the left rear speaker.

8. The display device of claim 1, wherein the positioning module includes a plurality of positioning modules, and wherein the plurality of positioning modules are configured to obtain position information of at least one external speaker among the plurality of external speakers for each of the plurality of positioning modules.

9. The display device of claim 8, wherein the plurality of positioning modules obtain the position information of plurality of the external speakers in a predetermined order.

10. The display device of claim 9, wherein the plurality of positioning modules include:

a first positioning module disposed at a horizontal centerline of the display device;

a second positioning module; and a third positioning module disposed on both sides of the first positioning module, and wherein the first positioning module is configured to obtain position information of one external speaker, and the second positioning module and the third positioning module are each configured to obtain position information of two external speakers.

11. The display device of claim 10, wherein the controller determines a center speaker based on the position information obtained by the first positioning module, determines two front speakers based on the position information obtained by the second positioning module, and determines two rear speakers based on the position information obtained by the third positioning module.

12. The display device of claim 11, wherein the second positioning module obtains the position information of each of the two external speakers from the plurality of external speakers excluding the center speaker, having a closest distance from the second positioning module, and wherein, if the second positioning module is disposed at a point horizontally offset to a left from the horizontal centerline of the display device, the controller determines the external speaker of the two external speakers, having a closer distance from the second positioning module, as a left front speaker and determines the other of the two external speakers as a right front speaker.

13. The display device of claim 11, wherein the third positioning module obtains the position information of each of the two external speakers from the plurality of external speakers excluding the center speaker and the front speaker, having a closest distance from the third positioning module, and wherein if the third positioning module is disposed at a point horizontally offset to a right from the horizontal centerline of the display device, the controller determines the external speaker of the two external speakers, having a closer distance from the second third positioning module, as a right rear speaker and determines the other of the two external speakers as a left rear speaker.

* * * * *